United States Patent
Moore

[11] Patent Number: 5,934,158
[45] Date of Patent: Aug. 10, 1999

[54] DIFFERENTIAL DRIVE MECHANISMS

[75] Inventor: John Westwood Moore, Northamptonshire, United Kingdom

[73] Assignees: Ricardo Consulting Engineers Limited, West Sussex, United Kingdom; Axial Wave Drive BV, Driebergen, Netherlands

[21] Appl. No.: 08/817,199
[22] PCT Filed: Oct. 13, 1995
[86] PCT No.: PCT/GB95/02427
  § 371 Date: Apr. 11, 1997
  § 102(e) Date: Apr. 11, 1997
[87] PCT Pub. No.: WO96/12124
  PCT Pub. Date: Apr. 25, 1996

[30]  Foreign Application Priority Data

Oct. 14, 1994 [GB]  United Kingdom ................... 9420795

[51] Int. Cl.[6] .................................................. F16H 48/12
[52] U.S. Cl. .................................................. 74/650; 74/66
[58] Field of Search ........................................ 74/650, 66

[56]  References Cited

U.S. PATENT DOCUMENTS

| | | | |
|---|---|---|---|
| 628,135 | 7/1899 | Williams | 74/66 |
| 1,098,423 | 6/1914 | Bayly | 74/650 |
| 1,561,150 | 11/1925 | Gerber | 74/66 |
| 4,291,591 | 9/1981 | Ross | 74/650 |
| 5,435,210 | 7/1995 | Moore et al. | 74/650 |
| 5,495,779 | 3/1996 | Harr | 74/650 |

FOREIGN PATENT DOCUMENTS

| | | | |
|---|---|---|---|
| 738601 | 12/1932 | France | 74/650 |
| 1181029 | 6/1959 | France | 74/650 |
| 23980 | 10/1906 | United Kingdom | 74/650 |

*Primary Examiner*—Rodney H. Bonck
*Assistant Examiner*—Scott Lund
*Attorney, Agent, or Firm*—McAulay Nissen Goldberg Kiel & Hand, LLP

[57]  ABSTRACT

A differential drive mechanism comprises a cage (1), which is rotatable about an axis (3) and represents the input, two coaxial output shafts (12, which are rotatable in respect of the cage (1) about the axis (3), a coupling (4) which is connected eccentrically through two output shafts (12) to transmit relative contra-rotational movement between them by connections which permit relative rotation of the coupling (4) and the output shafts (12). The eccentric connection of the coupling (4) on the ouput shafts (12) includes a respective eccentric hole (9) in the inner end (10) of each output shaft (12) in which the associated end (6) of the coupling (4) is received. The ends (6) of the coupling (4) have a part-spherical engagement surface. A slipper (8) affording a complementary part-spherical internal surface is received in each eccentric hole (9) and each engagement surface is in engagement which a respective complementary internal surface. The shape of the eccentric holes (9) and the external shape of the slippers (8) is such that rotation of the slippers (8) relative to the ouput shafts (12) is prevented.

3 Claims, 2 Drawing Sheets

DIFFERENTIAL DRIVE MECHANISMS

BACKGROUND OF THE INVENTION

The present invention relates to differential drive mechanisms, particularly automotive differentials of limited slip type, and is concerned with that type of differential drive mechanism which comprises a cage, which is rotatable about an axis and represents the input, two coaxial output shafts which are rotatable with respect to the cage about the said axis, a coupling which is connected eccentrically to the two output shafts to transmit relative contra-rotational movement between them by connections which permit relative rotation of the coupling and the output shafts about an axis substantially parallel to the said axis and a restraint member which is coupled to the cage and to the coupling such that the coupling is rotatable with respect to the cage about an axis substantially perpendicular to the said axis and capable of reciprocating movement in a direction perpendicular to the said axis but prevented from movement in a direction parallel to the said axis, the eccentric connection of the coupling and the output shafts including a respective eccentric hole in the inner end of each output shaft in which the associated end of the coupling is received, the ends of the coupling having a part-spherical engagement surface, a slipper which affords a complementary part-spherical internal surface being received in each eccentric hole and each engagement surface being in engagement with a respective complementary internal surface. Such a drive mechanism is disclosed in EP-A-0611166.

The provision of these slippers is very important because if they were not present the part-spherical engagement surface at the ends of the coupling would directly engage the surface of the associated eccentric hole whereby the contact between these two surfaces would necessarily be a point contact. In use, the force transmitted between the coupling member and the inner ends of the output shafts is very substantial indeed, and if this were transmitted through a point contact it would produce very substantial contact loads. When the differential is differentiating, that is to say when the two output shafts rotate relative to one another, this would rapidly lead to abrasion and destruction of the ends of the coupling and the surface of the eccentric holes.

DESCRIPTION OF THE PRIOR ART

In EP-A-0611166, the eccentric holes and the external shape of the sleeves are of circular section whereby the loads are transmitted between the sleeves and the inner ends of the output shafts over a line contact rather than a point contact which results in a substantial reduction in the contact pressures and thus in the abrasion of the contacting surfaces.

When the differential of EP-A-0611166 differentiates, the output shafts rotate with respect to the coupling. This rotational movement will occur between the sleeves and the surfaces of the eccentric holes or between the sleeves and the ends of the coupling or, more probably, a combination of the two. During differentiation, the coupling reciprocates or oscillates both linearly in the direction of the length of the restraint member and rotationally about the length of the restraint member. The amplitude of the rotational oscillation will depend on the dimensions of the various components but is typically 36°. Thus in the two extreme positions, the longitudinal axis of the coupling may be inclined at, say, 18° to the longitudinal axis of the output shafts.

Due to the necessity of making the differential and its components as strong and as compact as possible this introduces the risk of the coupling member fouling, that is to say coming into engagement with, the edge of the slipper and perhaps also the edge of the eccentric hole.

This potential problem is overcome in EP-A-0611166 by cutting away the surface of the coupling, that is to say providing the coupling with a neck, directly inboard of the part-spherical engagement surfaces. Whilst this overcomes the potential problem, it does result in a structural weakening of the most highly stressed component of the differential, namely the coupling member. This can only be overcome by making the coupling member larger and thus heavier over its entire length, except at the necked or reduced area portion than is actually required for load bearing purposes, whereby the entire differential is larger and heavier than would otherwise be the case. It might be thought that the problem could be overcome instead by cutting away a portion of the edge of the eccentric holes and, if necessary, of the slippers. However, since the slippers rotate in the eccentric holes, this would necessitate cutting away the edges of the eccentric holes and of the slippers around their entire periphery since the portion of the edge of the holes and of the slippers which is closest to the coupling, when it is at its maximum inclination to the axis of the output shafts, can not be predicted. This would seriously weaken one of the other of the most highly loaded components of the differential, namely the inner ends of the output shafts in which the eccentric holes are formed. This could be overcome only by making these inner ends larger and thus heavier than would otherwise be required.

It is therefore the object of the invention to provide a differential mechanism of the type referred to above which can accommodate the inclination of the coupling to the output shafts which occurs during differentiation without the increase in size, weight and cost which is necessary for this purpose in EP-A-0611166.

SUMMARY OF THE INVENTION

According to the present invention a differential mechanism of the type referred to above is characterised in that the shape of the eccentric holes and the external shape of the slippers is non-circular, whereby rotation of the slippers relative to the output shafts is prevented, that portion of the inner end of each output shaft which defines the associated eccentric hole which is opposite to the direction of eccentricity of the hole, and/or the associated portion of the slipper, being cut away.

The slippers are thus always retained in a fixed predetermined rotational position with respect to the output shafts and the rotation of the output shafts relative to the coupling results in relative movement only between the part-spherical engagement surfaces on the coupling and the corresponding internal surfaces on the slippers and not between the slippers and the output shafts. This means that when the coupling is at its maximum inclination to the axis of the output shafts it is opposed to a predetermined portion, that is to say always the same portion, of the inner end of each output shaft and this portion and/or the corresponding portion of the slipper is cut away to prevent actual contact occurring. In practice this portion is on that side of each eccentric hole which is opposed to the direction of the eccentricity of the hole. The cut away portion preferably closely matches the shape of the coupling and is thus of part-circular section. The coupling can therefore be of constant cross-section over its length, excluding the part-spherical engagement surfaces, and is thus lighter and smaller for equivalent strength than in EP-A-0611166. The provision of the cut away portions in accordance with the present invention also means that the maximum inclination of the coupling member to the axes of the output shafts may be increased which is extremely beneficial in that it inherently results in a decrease in the contact pressure between the slippers and the surfaces of the eccentric holes.

The invention is based on the recognition that the forces transmitted between the sleeves and the output shafts do not pass through all areas of the surfaces of the slippers but only through the very small areas constituted by the lines where planes, which pass through the centres of the internal surfaces of the slippers perpendicular to the direction of eccentricity of the eccentric holes, pass through the external surfaces of the slippers. Since the slippers do not rotate relative to the output shafts, all the forces pass through one of two relatively small areas of the inner ends of each output shaft, depending on whether the engine is driving the wheels of the vehicle or vice versa. The portion of the inner ends of the output shafts which is cut away is spaced away from these areas by 90°, and thus the removal of material from the output shafts does not in fact in any way reduce their load-transmitting ability.

The exterior surface of the slippers and the interior surface of the eccentric holes may be of any desired, complementary non-circular shape and thus may be of oval, polygonal, splined or irregular shape. Indeed, it is not essential that the eccentric holes and the slippers be of complementary shape and they could be of different shape, though it is desirable that the actual portions of their surfaces through which the forces are transmitted are of the same shape. What is essential is that relative rotation of the slippers and the eccentric holes is prevented and that their shape is such that reciprocation of the slippers, i.e. movement of the slippers parallel to the axis of the output shafts, is not prevented. However, it is preferred that the external surface of each slipper includes two parallel planar portions extending parallel to the direction of eccentricity of the eccentric holes and situated on opposite sides of the slipper in engagement with complementary planar portions of the surface of the associated eccentric hole. This means that the forces transmitted between the slippers and the output shafts are transmitted through a substantial area contact, rather than a line contact as in the prior publication, whereby the contact pressures are substantially reduced and wear and abrasion are thus reduced also. The slippers may therefore be of generally square or rectangular shape or of polygonal shape with an even number of sides or possibly with an uneven number of sides if it is desired to impart different characteristics under drive and overdrive conditions.

Each slipper may be of one piece construction or it may be constituted by two separate pieces or shells. These shells may contact one another or spaces may be left between them. Since the forces transmitted between the slippers and the output shafts are in fact transmitted through two relatively small areas, the portions of the slippers outside these areas serve substantially no function and this opens up the possibility of omitting these portions. Thus in a further embodiment of the invention, each slipper is constituted by two separate load transmission members on diametrically opposite sides of the associated eccentric hole, the inner surface of each load transmission member being part-spherical and its outer surface being in engagement with a complementary surface constituted by a portion of the surface of the eccentric hole. The outer surface of each load transmission member may be planar or alternatively it may be e.g. convex and part-cylindrical. Thus in this embodiment the eccentric holes comprise a circular portion, whose diameter is only slightly larger than that of the part-spherical engagement surfaces, with two diametrically opposed smaller portions communicating therewith which receive respective load-transmission members, which are preferably of circular cross-section. It will also be appreciated that the load-transmission members are situated such that a hypothetical plane which passes through the centre of the part-spherical engagement surfaces parallel to the axes of the output shafts and perpendicular to the direction of eccentricity of the associated eccentric hole passes through them so that they are correctly positioned to transmit the forces which are generated during differentiation.

BRIEF DESCRIPTION OF THE DRAWINGS

Further features and details of the invention will be apparent from the following description of two specific embodiments of automotive differential which is given by way of example with reference to the accompanying diagrammatic drawings, in which:

FIGS. 5 and 6 are to a sub-embodiment having pads with flat external surfaces. FIGS. 5A and 6A are to a further sub-embodiment in which the pads have part-spherical external surfaces.

DESCRIPTION OF THE PREFERRED EMBODIMENTS

Figure 1:
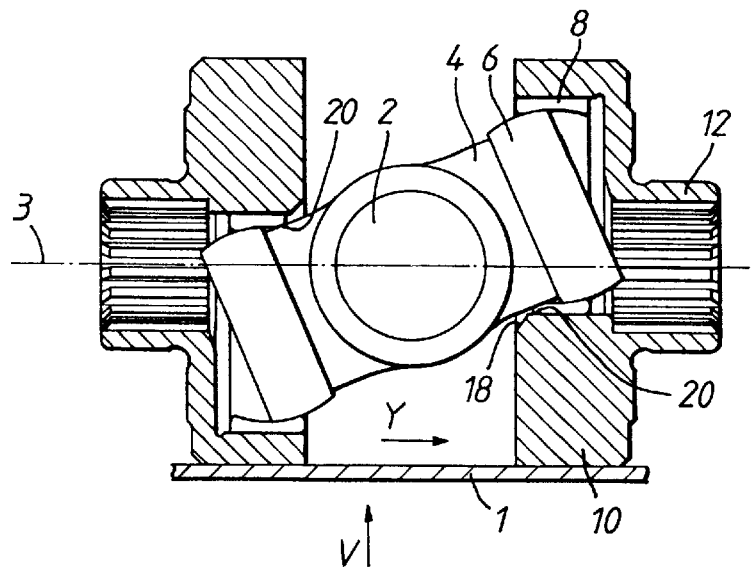
FIG. 1 is a sectional view of the first embodiment of automotive differential in accordance with the invention in a direction perpendicular to the restraint member on the line Z—Z in FIG. 3.
Figure 2:
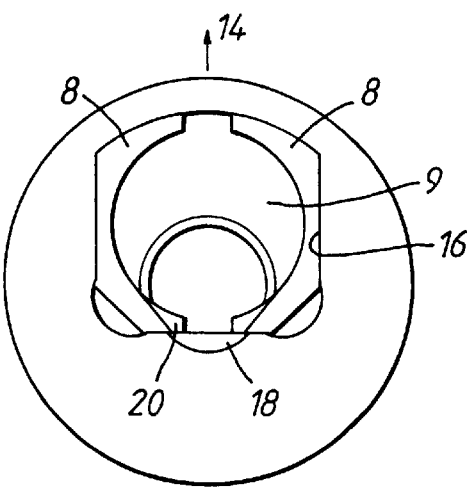
FIG. 2 is a view of the inner end of one output shaft and the associated slippers in the direction of the arrow Y in FIG. 1.
Figure 3:
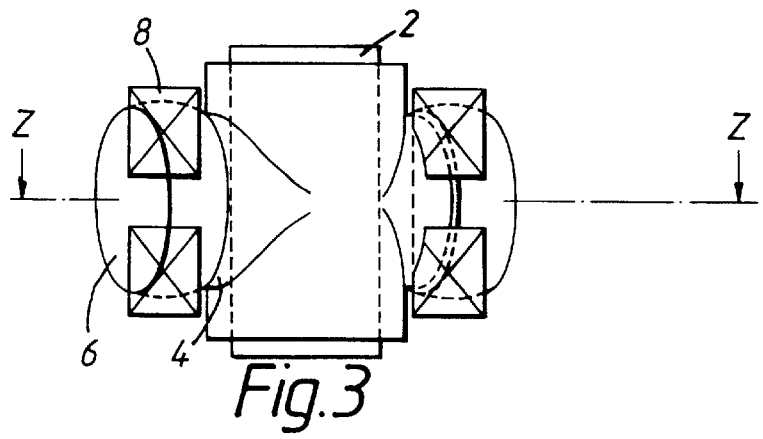
FIG. 3 is a side view of the composite cruciform shaped coupling and restraint members and the associated slippers in the direction of the arrow V in FIG. 1.
Figure 4:
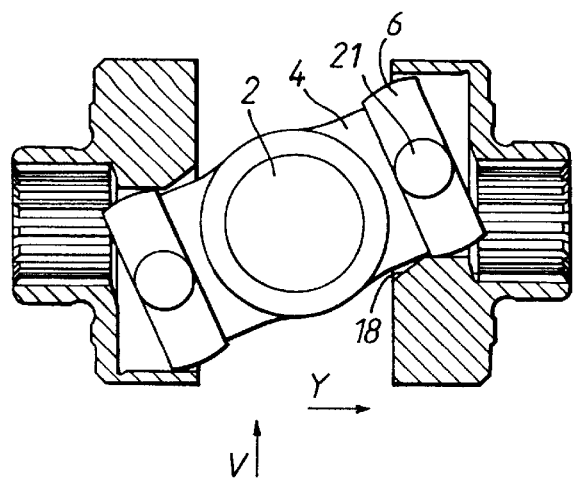
FIGS. 4, 5, 5A, 6 and 6A are views of a second embodiment that correspond to FIGS. 1, 2 and 3 respectively.

Referring firstly to FIGS. 1 to 3, the construction and operation of the differential are substantially similar to those described in detail in EP-A-0611166, the disclosure of which is incorporated herein by reference, and will therefore not be described again. The restraint member 2 is slidably retained in the outer cage 1 of the differential and is integral with the coupling member 4, with which it forms an integral cruciform member. The coupling member 4 is of constant cross-section along its length except for the thickened portion 6 at its ends which afford part-spherical engagement surfaces. These latter surfaces engage complementary part-spherical surfaces afforded by the interior of the respective slippers, each of which is constituted by separate half shells 8. The slippers are accommodated in respective eccentric holes 9 formed in the inner thickened ends 10 of the output shafts 12, that is to say holes which are offset in the direction 14 from the axis of the output shafts 12, when viewed in the direction of the axis of the output shafts. The shafts 12 are rotatable with respect to the cage 1 about an axis 3 and the cage is itself rotatable about this axis. Each eccentric hole 9 is of constant cross-section over its depth and its peripheral surface includes two planar portions 16 extending parallel to the direction 14. The shape of the two further portions linking the ends of these portions 16 is not crucial but in the present case each hole 9 is of very generally square shape, one of the further portions being generally planar and the other being arcuate. The external shape of the slippers 8 matches that of the eccentric holes.

When differentiation of the differential occurs, rotation of the slippers within the eccentric holes is prevented by their shapes, and all the relative movement occurs between the engagement surfaces on the thickened portions 6 of the coupling member 4 and the complementary internal surfaces of the slippers. All the forces transmitted between the slippers and the surfaces of the eccentric holes are directed perpendicular to the direction 14, when viewed in the direction of the axis 3 of the output shafts 12, and thus pass through the surfaces 16 and the complementary surfaces on the exterior of the slippers 8. Due to the fact that these surfaces are planar, the contact between the cooperating pairs of surfaces is over a relatively large area and the contact pressures are therefore relatively small.

During differentiation, the coupling member 4 oscillates angularly, when viewed in the direction of the length of the restraint member 2, between one extreme position, illustrated in FIG. 1, and a corresponding extreme position in which the coupling member is inclined by an equal but opposite amount to the axis of the output shafts. At these two extreme positions, the coupling member is situated very close to the inner ends 10 of the output shafts and tends to come into contact with it.

However, such contact is prevented by providing the inner end 10 of each output shaft and each half shell 8 with a cut-away portion 18,20, respectively, which receives the coupling member, when it is in the extreme positions. Due to the fact that rotation of the slippers relative to the output shafts is prevented, the coupling member always approaches the same portion of the slippers and the inner ends 10 of the output shafts, when in its extreme positions, and thus a single cut-away portion of small angular extent in the slippers 8 and inner ends 10 is sufficient for this purpose. As may be seen in FIG. 2, this cut-away portion is formed at a location remote from that through which the forces are transmitted and thus in practice does not reduce the strength, that is to say the load-transmitting ability, of either the slippers 8 or the inner ends 10.

In the second embodiment illustrated in FIGS. 4, 5, 5A, 6 and 6A the slippers are each constituted by two quite separate opposed cylindrical pads 21, whose inner surface is part-spherical and whose outer surface is planar and engages a complementary planar surface which forms a proportion of the internal surface of the associated eccentric hole. Each eccentric hole thus comprises a circular section portion, whose diameter is substantially the same as that of the part-spherical engagement surfaces on the ends of the coupling member and two diametrically opposed lobes which are of cylindrical shape with their axes coincident with the diameter of the circular portion perpendicular to the direction 14 and whose diameter is substantially the same as that of the pads 21. The pads 21 therefore lie on the line along which the forces are transmitted between the coupling member and the output shafts. Due to the fact that the slippers are so small, no cut-away portion need be formed in them and there is merely a single cut-away portion 18 formed on each inner end 10. The structure, operation and advantages of this construction are otherwise the same as those of the first embodiment described above.

Figure 5:
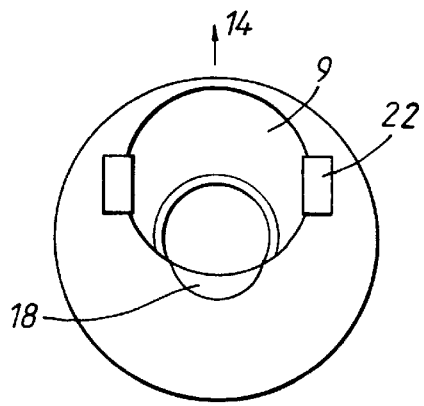
Figure 5A:
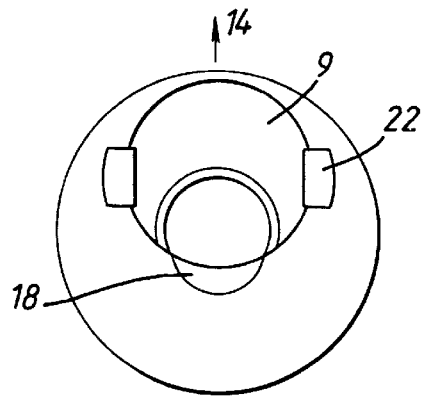
Figure 6:
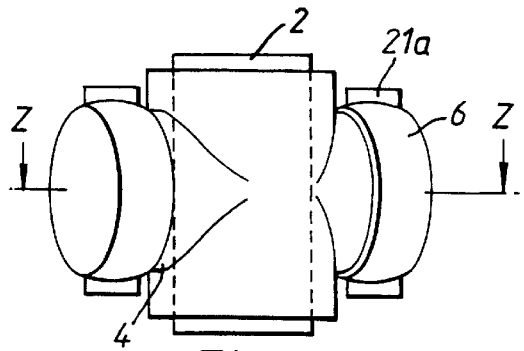
Figure 6A:
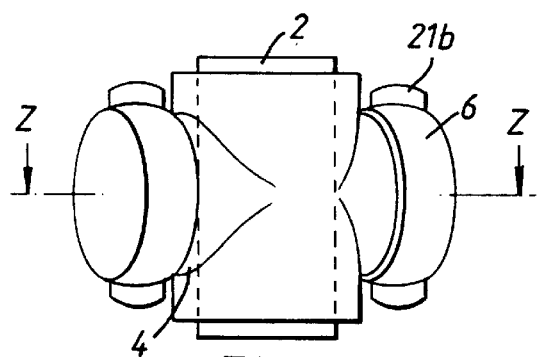

In the second embodiment, the outer surface of the pads 21 may be either planar 21a as shown in FIGS. 5 and 6 or may be convex and part-spherical 21b as shown in FIGS. 5A and 6A. In the latter case, the convex and part-spherical outer surfaces 21b have a large radius of curvature, preferably larger than that of the hole 9, and the opposing surface of the recess 22 or lobe is correspondingly concave. This results in contact between these two surfaces being reduced theoretically to point contact but in practice to a small patch. It can be shown that the pads 21 will then not slide on the inner surface of the associated recess but will roll over it. Similarly, the contact between the coupling member and the pads 21 will be a rolling contact. This will result in reduced friction and wear at these interfaces.

While preferred embodiments of the invention have been shown and described in detail, it will be apparent to those skilled in the art that various changes and modifications may be made without departing from the invention as embraced by the following claims.

I claim:

1. A differential drive mechanism comprising:

a cage (1) which is rotatable about a first axis (3) and represents an input, two coaxial output shafts (12) which are rotatable with respect to the cage (1) about said first axis (3), said output shafts each having an inner end (10), a coupling (4) which is connected eccentrically to the two output shafts (12) to transmit relative contra-rotational movement between them by eccentric connections which permit relative rotation of the coupling (4) and the output shafts (12) about an axis substantially parallel to said first axis (3), the eccentric connections of the coupling (4) and the output shafts (12) including a respective eccentric hole (9) in said inner end (10) of each output shaft (12), in which an associated end (6) of said coupling (4) is received, each end (6) of said coupling (4) having a part-spherical engagement surface, each eccentric hole being offset from said first axis in a direction of eccentricity, a restraint member (2) which is coupled to the cage (1) and to the coupling (4) such that the coupling (4) is rotatable with respect to the cage (1) about an axis substantially perpendicular to said first axis (3) and capable of reciprocating movement in a direction perpendicular to said first axis (3) but prevented from movement in a direction parallel to said first axis (3), and a slipper comprising two diametrically opposed pads (21) being received in each eccentric hole (9), each of said pads (21) having a part-spherical internal surface and being received in a respective recess (22) formed in a side wall of an associated eccentric hole (9), each engagement surface of said coupling being in engagement with the internal surface of each of said pads, wherein a shape of the eccentric holes (9) and an external shape of the slippers is such that rotation of the slippers relative to the output shafts (12) is prevented, wherein a portion of said inner end (10) of each output shaft (12) which defines the associated eccentric hole (9) and which is opposite to the direction of eccentricity (14) of the associated eccentric hole (9) is cut away.

2. A mechanism as claimed in claim 1 wherein said pads have an external surface, said external surface including oppositely facing parallel planar portions in contact with complementary planar portions of a surface of the respective recess formed in said side wall of the associated eccentric hole.

3. A mechanism as claimed in claim 1 wherein said pads have an external surface, said external surface including oppositely facing part-spherical portions in contact with complementary part-spherical portions of a surface of the respective recess formed in said side wall of the associated eccentric hole.

* * * * *